United States Patent [19]

Suzuki et al.

[11] Patent Number: 4,653,852

[45] Date of Patent: Mar. 31, 1987

[54] MULTI CORE OPTICAL FIBER

[75] Inventors: Shuzo Suzuki; Ichiro Ogasawara; Hiroshi Yokota, all of Yokohama; Shim Sumida, Mito, all of Japan

[73] Assignees: Sumitomo Electric Industries, Ltd, Osaka; Nippon Telegraph and Telephone Public Corporation, Tokyo, both of Japan

[21] Appl. No.: 688,506

[22] Filed: Jan. 3, 1985

[30] Foreign Application Priority Data

Jan. 5, 1984 [JP] Japan ................... 59-21[U]

[51] Int. Cl.⁴ .............................................. G02B 6/22
[52] U.S. Cl. ................................ 350/96.33; 350/96.23
[58] Field of Search ................ 350/96.23, 96.30, 96.33

[56] References Cited

U.S. PATENT DOCUMENTS

| T900,002 | 7/1972 | Wielar, II | 350/96.23 X |
| 4,147,407 | 4/1979 | Eichenbaum et al. | 350/96.23 X |
| 4,176,910 | 12/1979 | Nöethe | 350/96.23 OR |
| 4,547,040 | 10/1985 | Yamamoto et al. | 350/96.3 X |

Primary Examiner—John Lee
Attorney, Agent, or Firm—Cushman, Darby and Cushman

[57] ABSTRACT

A multi core optical fiber made of quartz glass comprising at least two cores the centers of which are arranged substantially on one line. The distances between the centers of the adjacent cores are substantially the same in the longitudinal direction. A first cladding covers the cores and the second cladding covers the first cladding and has a larger refractive index than the first one. The fiber has improved mechanical strength and low crosstalk even if the distance between the adjacent cores is short.

3 Claims, 9 Drawing Figures

Fig. 1
(PRIOR ART)
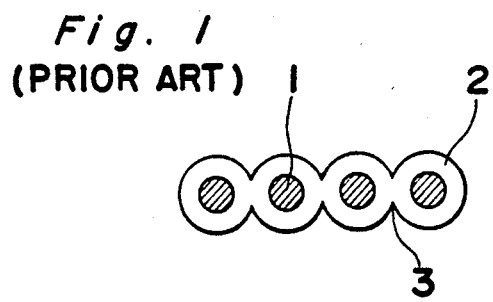
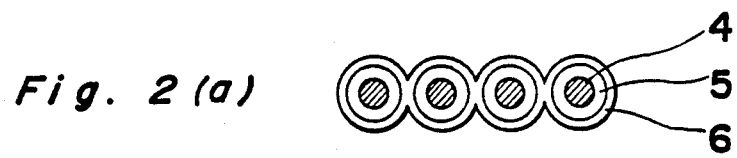
Fig. 2(a)
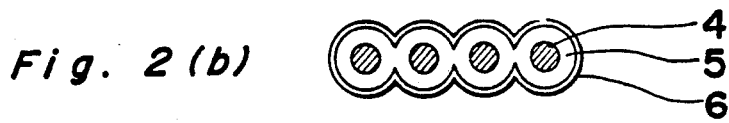
Fig. 2(b)
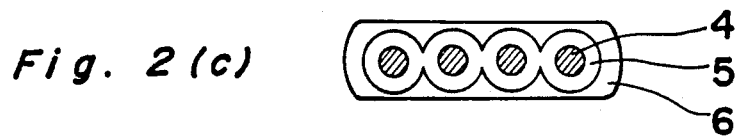
Fig. 2(c)
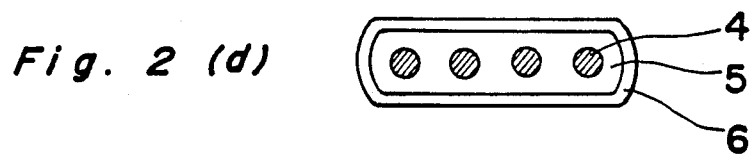
Fig. 2(d)

4,653,852

MULTI CORE OPTICAL FIBER

FIELD OF THE INVENTION

The present invention relates to a multi core optical fiber. More particularly, it relates to a multi core optical fiber having improved mechanical strength and little cross-talk even if a distance between the adjacent cores is short.

BACKGROUND OF THE INVENTION

A conventional multi core optical fiber has a cross section shown in FIG. 1, in which the cores 1 are arranged in parallel, and are each other with substantially equal distanced and covered with the cladding 2. To integrate more cores each having a certain diameter in a unit cross sectional area, usually, the thickness of the cladding is decreased. Since the decrease of the thickness of the cladding results in the decrease of the distance between the adjacent cores, there arise some disadvantages such as cross-talk in communication. Therefore, the distance between the adjacent cores should be at least twice the core diameter and the maximum number to be integrated in a unit cross sectional area is limited.

Since the outer surface of the conventional multi core optical fiber has depressions 3, applied external stress is concentrated on these depressions so that it is more easily damaged than a single core optical fiber. In addition, since the depressions increase the outer surface area of the fiber there is an increase in the probability of the fiber breaking, and thus a fiber having good mechanical strength is not produced.

SUMMARY OF THE INVENTION

One object of the present invention is to provide a multi core optical fiber having improved mechanical strength.

Another object of the present invention is to provide multi core optical fiber which has a little cross-talk even if the distance between the adjacent cores is short.

According to the present invention, there is provided a multi core optical fiber made of quartz glass comprising at least two cores the centers of which are arranged substantially on one line. The distances between the centers of the adjacent cores are substantially the same in the longitudinal direction. A first cladding covers the cores and a second cladding covers the first cladding and has a larger refractive index than the first cladding.

BRIEF DESCRIPTION OF THE DRAWINGS

FIG. 1 is a cross section of a conventional multi core optical fiber,

FIGS. 2A to 2D are cross sections of the various embodiments of the multi core optical fiber of the invention.

DETAILED DESCRIPTION OF THE DRAWINGS

Figure 3:
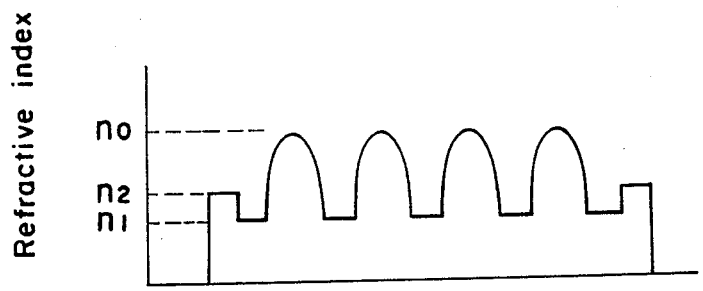
FIG. 3 shows a distribution of the refractive index in the multi core optical fiber of the invention.

FIGS. 2A to 2D show cross sections of various embodiments of the multi core optical fiber of the invention. In these embodiments, the optical fiber comprises four cores 4 and their centers are arranged substantially on one line with substantially equal distances. The first cladding 5 surrounds the cores 4 and the second cladding 6, surrounds cladding 5. In the embodiment of FIG. 2A, each core 4 is surrounded by the corresponding first cladding 5 and the second cladding 6 continuously surrounds the first cladding 5. In the embodiment of FIG. 2B, both the first and second claddings 5 and 6 continuously surround the cores 4. In the embodiment of FIG. 2C, both the first and second claddings 5 and 6 continuously surround the cores 4 and the depressions between the cores are filled with the second cladding 6 to give a smooth outer surface. In the embodiment of FIG. 2D, the interface between the first and second claddings and the outer surface of the second cladding 6 do not have any depression.

FIG. 3 shows a distribution of the refractive index along the line on which the core centers are present. The refractive index of the core is smaller than that of the first cladding, and that of the first cladding is larger than that of the second cladding.

Now, the relation between ratio of the core diameter to the core distance and cross-talk (dB) will be discussed.

Figure 4:
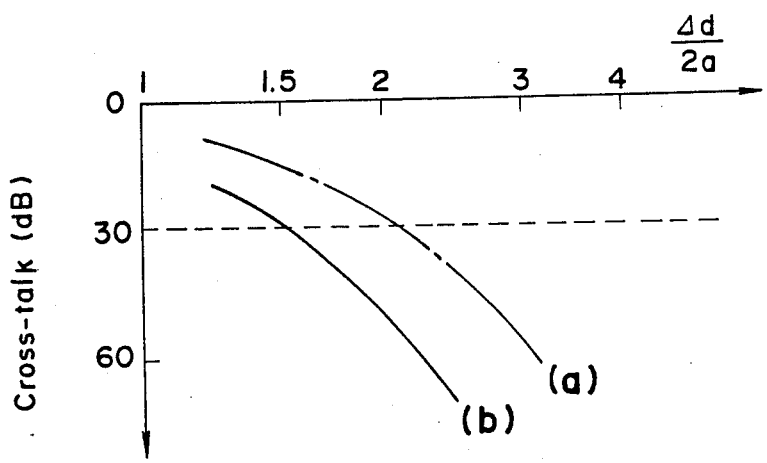
FIG. 4 shows relation between the ratio of the core diameter to the core distance and cross-talk (dB)

In FIG. 4, the line (a) shows said relation for a conventional multi core optical fiber having the cross section of FIG. 1 and a length of 2 Km in which the core diameter is 20 to 100 micrometers. The difference of the refractive indexes of the core and the first cladding is 1% and the fiber is used for multi mode transmission. The line (b) shows said relation for the multi core optical fiber having the cross section of FIG. 2B under the same conditions as above. Since, generally, the cross-talk must be lower than −30 dB, the ratio of the core diameter to the core distance should be larger than 2 in the conventional one as is clear from the line (a) of FIG. 4.

Figure 5:
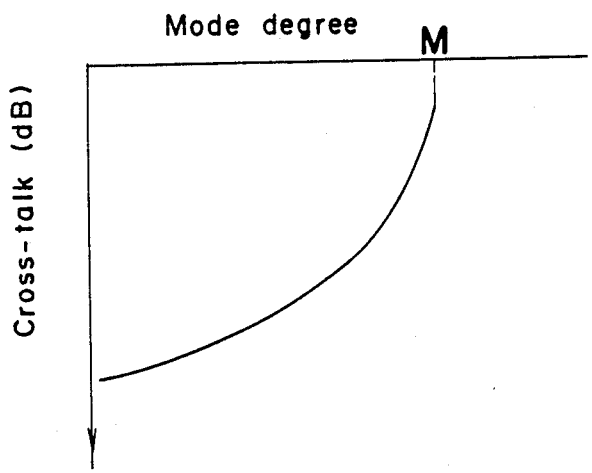
FIG. 5 shows relation between the mode degree M and cross-talk (dB)
Figure 6:
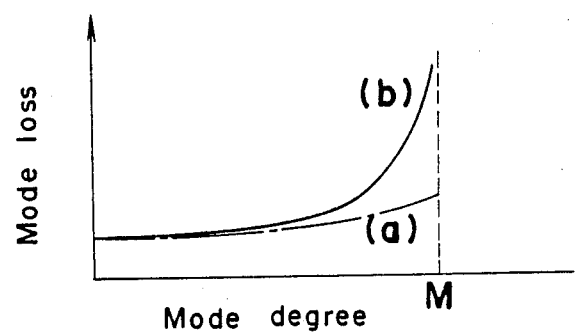
FIG. 6 shows relation between the mode degree M and the mode loss.

On the contrary, the refractive indexes in the fiber are determined by the following equations:

$$\frac{n_0 - n_1}{n_0} \times 100 = 1\%$$

$$\frac{n_1 - n_2}{n_0} \times 100 = -0.2\%$$

wherein $n_0$, $n_1$ and $n_2$ are refractive indexes of the core, the first cladding and the second cladding, respectively, and the ratio of the core distance to the core diameter is about 1.5 at the cross-talk of −30 dB. Therefore, the cross-talk is greatly decreased even if the core distance is significantly decreased. The reason for this is as follows:

Through the cores of the multi core optical fiber, a number of modes are transmitted. Since the fiber is a surface wave line, a part of the light to be transmitted leaks out in and passes through the cladding. The amount of light leakage increases as the degree of the mode increase as shown in FIG. 5. Since the multi core optical fiber of the invention has the second cladding having the larger refractive index than that of the first one, the high degree mode is easily connected to the radiation mode, and practically, the attenuation in the high degree mode is more effectively reduced so that the increase of the cross-talk is prevented. This relation is shown in FIG. 6. Alternatively, when the attenuation in the second cladding is made larger than that of the first cladding, the same result is obtained.

Now, the strength of the optical fiber will be considered. In general, the optical fiber having less surface area is less damaged and its strength per unit surface area is improved. Since the optical fibers of the invention shown in FIGS. 2C and 2D have less surface areas than the conventional one shown in FIG. 1, they have improved mechanical strength. When the glass surface has a depression, the external stress is concentrated on the depression resulting in a decrease of the mechanical strength. Therefore, the optical fiber of FIGS. 2C and 2D has improved mechanical strength. In addition to this improvement, the optical fiber of the invention has further advantages in that it is more difficult for a plastic covering applied around the fiber to be peeled off since the fiber has a smooth outer surface.

What is claimed is:

1. A multi core optical fiber made of quartz glass comprising:
   a plurality of cores having centers arranged substantially on one line, wherein the distances between the centers of adjacent cores are substantially the same in the longitudinal direction,
   a one piece first cladding surrounding said plurality of cores and,
   a one piece second cladding surrounding said first cladding and having a larger refractive index than said first cladding.

2. A multi core optical fiber according to claim 1, wherein said second cladding has no depressions.

3. A multi core optical fiber according to claim 1, wherein said first cladding has no depressions.

* * * * *